United States Patent [19]

Grant, Jr. et al.

[11] 4,349,758

[45] Sep. 14, 1982

[54] MODULAR HAND MIXER

[75] Inventors: Edward J. Grant, Jr., Chicago; William H. Scott, Lombard; John M. Stipanuk, Glen Ellyn, all of Ill.

[73] Assignee: Sunbeam Corporation, Chicago, Ill.

[21] Appl. No.: 111,412

[22] Filed: Jan. 11, 1980

[51] Int. Cl.³ ............................................. H02K 11/00
[52] U.S. Cl. .................................. 310/68 A; 310/68 B; 310/50; 310/194; 318/305; 318/351
[58] Field of Search ................... 310/42, 194, 91, 135, 310/89, 245, 247, 47, 112, 50, 68 R, 68 A, 68 B, 68 E, 189, 191, 43, 45, 75 R, 206, 207, 233, 83, 190, 191, 209, 248; 323/340; 318/305, 351

[56] References Cited

U.S. PATENT DOCUMENTS

| | | | |
|---|---|---|---|
| 2,554,506 | 5/1951 | Schwarz | 310/68 A |
| 2,737,371 | 3/1956 | Gerry | 310/68 A |
| 2,753,472 | 7/1956 | Schott | 310/68 A |
| 3,159,763 | 12/1964 | Colvill | 310/245 |
| 3,418,504 | 12/1968 | Paule | 310/50 |
| 3,908,142 | 9/1975 | Gaudry | 310/245 |
| 4,081,704 | 3/1978 | Vassos | 310/42 |
| 4,241,297 | 12/1980 | Piber | 310/50 |

*Primary Examiner*—R. Skudy

*Attorney, Agent, or Firm*—George R. Clark; Neil M. Rose; Clifford A. Dean

[57] ABSTRACT

A modulator motor and drive unit for use in an electrical device, such as a hand food mixer, wherein the motor is characterized by a low-cost speed control which is capable of providing a large number of discrete motor speeds. The speed control, rather than utilizing a multi-contact switch connected to the field coil by individual taps, has approximately twenty field coil continuous loop taps wound over a bobbin spindle in side-by-side relationship with a wiper contact being slideably movable relative thereto along a path from which the insulation has been removed. Positions of the wiper contact may be determined by replaceable detent elements provided with different detent patterns providing different series of motor speeds whereby the same motor and drive module may be provided within a suitable housing(s) for the economical production of several different models of such electrical devices having differing speed selections. The housing halves are provided with module supporting means and may be permanently secured together by adhesive means. The motor is also characterized by a torsion spring and brush guide arrangement which prevents any contact of the brush springs with the motor commutator.

9 Claims, 9 Drawing Figures

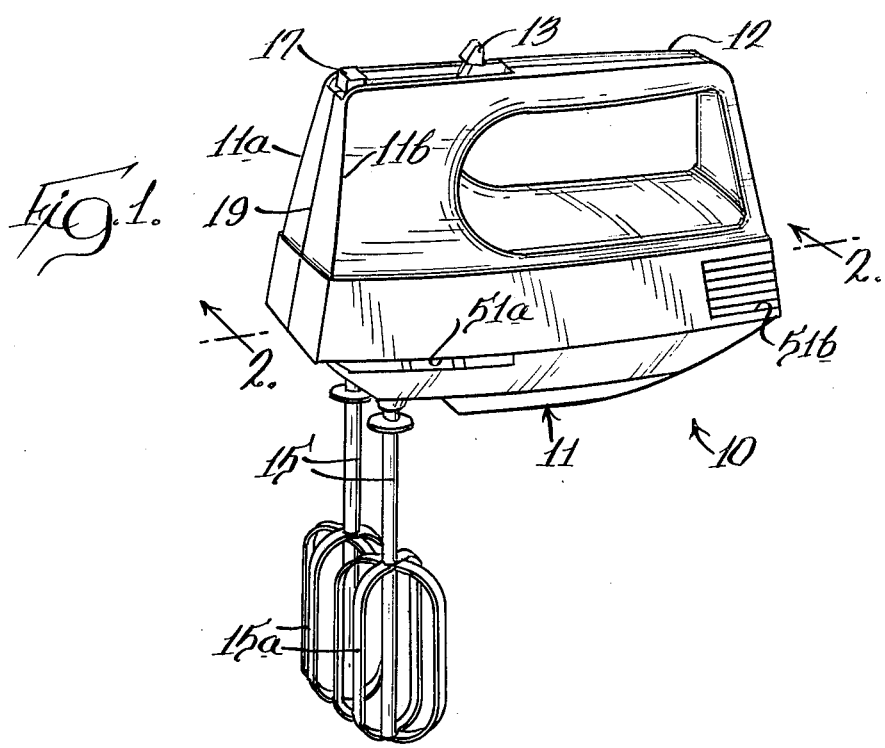
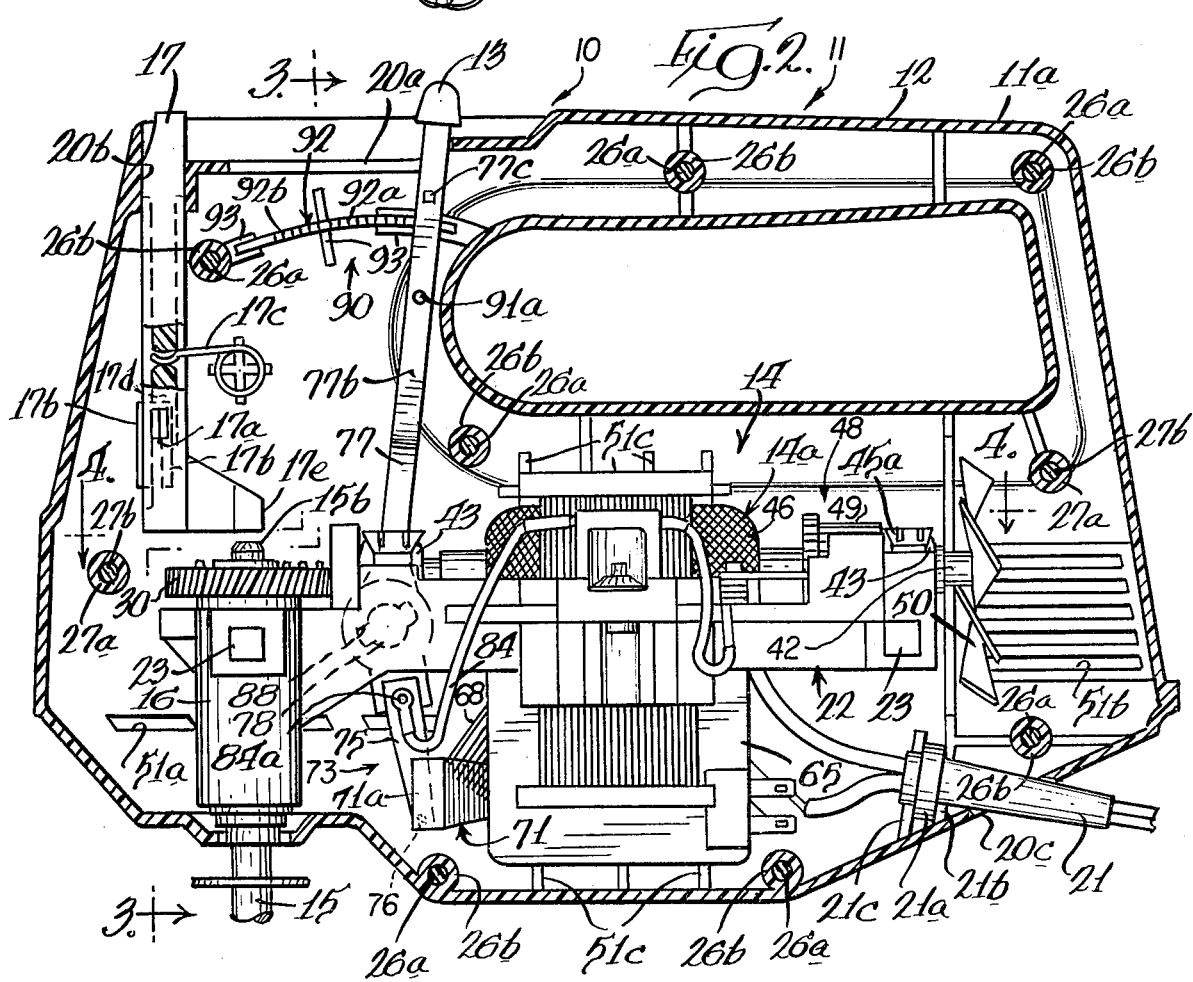

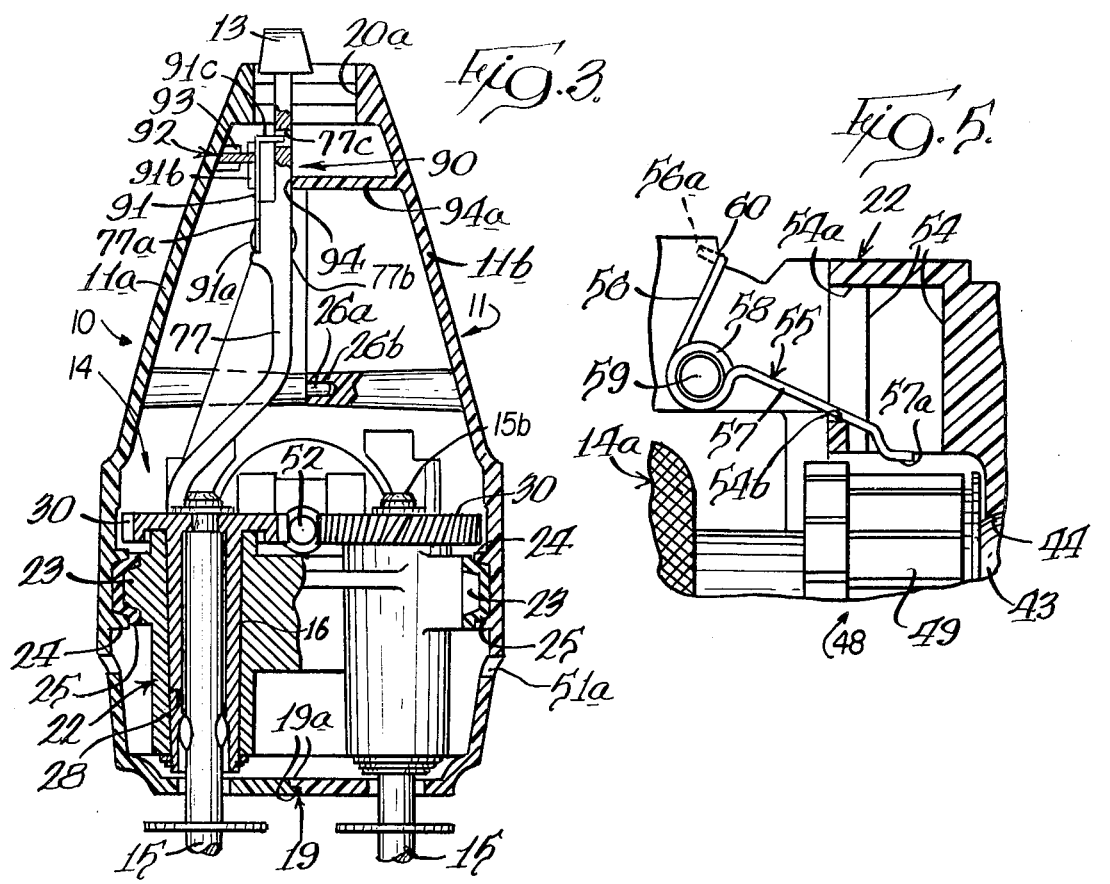
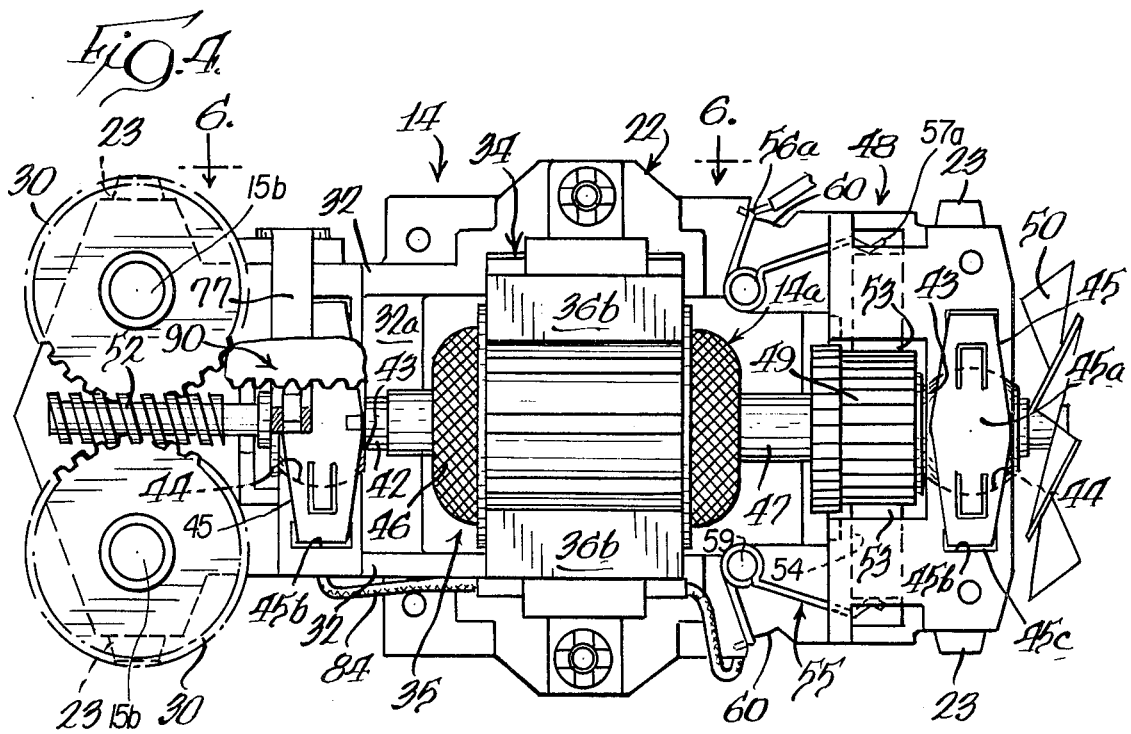

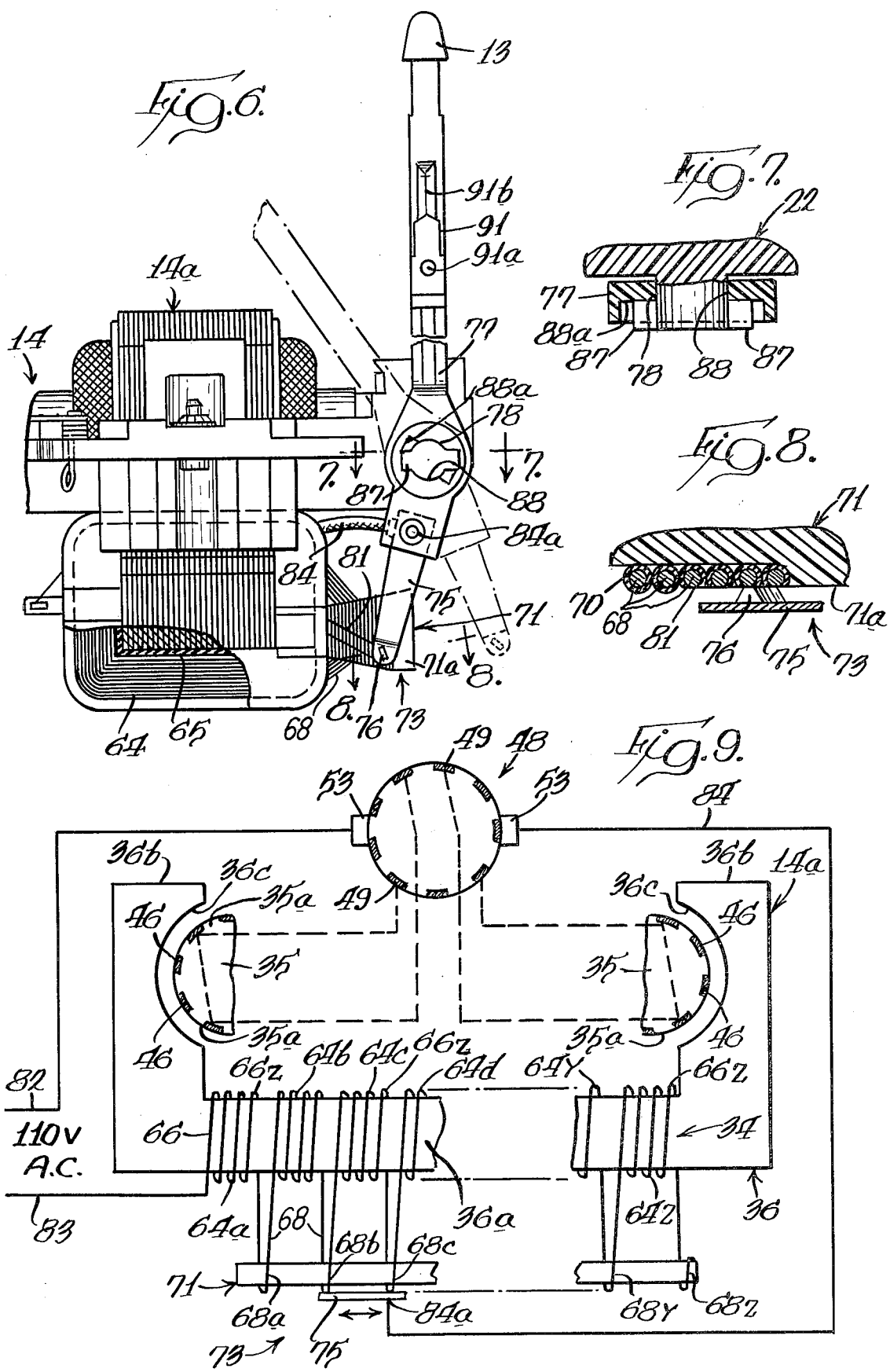

MODULAR HAND MIXER

BACKGROUND OF THE INVENTION

In the small appliance and tool field, such as hand held mixers, knives and drills, a universal series motor is used to operate one or more tool elements that move to accomplish a specific task. In such units, it is quite important to be able to vary the speed output of the operating tool element. In the control of such appliances, especially one powered by a low or fractional horsepower universal series motor, it is possible to vary the speed of the motor by varying the effective field coil windings.

Thus, the typical universal motor has a field coil and a wound armature connected in a series power circuit via commutator means carried on the armature. Selective taps are taken off the field coil windings and are connected by lead wires to a switching means for bypassing some of the field coil windings. This changes the number of windings of the effective field coil and thus the amperage conducted in the power circuit, the lowest number of field coil windings providing the greatest motor speed and the highest number of field coil windings providing the lowest motor speed. However, this requires the use of a multi-contact switch and further only provides for a step-by-step variation in the motor speed depending on the number of separate taps and positions available on the switch. Further, the cost of the switch and the required lead wires and insulation as well as the cost of the necessary steps of stripping insulation from the lead wires, soldering and applying insulation to connections typically adds appreciably to the overall cost of the unit.

Another problem area is in the commutator means and particularly the means for biasing the commutator brush against the rotating commutator contacts while preventing the biasing means from ever engaging the commutator contacts should the brush become overly worn and/or dislodged from its guides. In this regard, the commutator brush is typically formed of a carbon alloy or compound and is relatively soft when compared to biasing means generally formed of a hard conductive metal. Thus, if the biasing means were allowed to engage the rotating commutator contacts, the commutator contacts could be torn up and damaged.

The appliance and tool field is highly competitive and every cost-saving gives an edge to the supplier. The manner of assembly thereby becomes quite critical, where the number of separate steps needed to assemble the appliance as well as the number of separate individual pieces needed in the assembly can critically add to the cost of manufacture to the extent that the appliance or tool may be priced out of the market. Thus, complexity of the construction is detrimental while simplicity of both the construction and the manner of assembly are highly beneficial.

Lastly, the cost saving in providing a modular motor construction for small appliances whereby various models may be provided with different numbers of operating speeds by merely utilizing a different speed control detent with the same modular motor is obviously considerable.

SUMMARY OF THE INVENTION

This invention relates to a motor-driven appliance and specifically teaches a modular motor construction, an improved speed control for the motor powering the appliance, an improved manner of biasing the commutator brush against the commutator contacts, and an improved method of assembly of the appliance.

Specifically, the motor field coil is formed of many separate windings serially connected together with a continuous loop tap being taken off the end of each winding. The loop taps are wound around a spindle adjacent one another and a conductive wiper may be selectively and slidably engaged in contact with any one or adjacent pair of loop taps. An electric power series connection is made through the commutator means, the wiper, and through the field coil from the end winding, so that the positioned wiper bypasses none or some of the windings to effectively vary the motor speed.

The spring for biasing the commutator brush toward the commutator contacts is in the form of a torsion spring having opposite end legs and an intermediate bend interconnecting the legs. One spring leg is extended through an opening in brush-guiding wall means and is adapted to move transversely to bias the commutator brush toward the commutator contacts. The brush-guiding wall means adjacent the opening is adapted to support the one spring leg and preclude the same from contacting the commutator contacts even in the absence of the commutator brush.

The improved appliance construction utilizes a modular motor and power unit that is enclosed and held between two mating housing halves by means of housing abutments or guides with two housing halves being bonded together by a suitable adhesive without the need for the usual fastener connectors.

BRIEF DESCRIPTION OF THE DRAWINGS

FIG. 1 is a perspective view of a hand mixer appliance incorporating various aspects of the disclosed invention;

FIG. 2 is an enlarged vertical sectional view taken generally along line 2—2 of FIG. 1, except cutting only through the housing and not through the major operating components except as noted on a localized basis for clarity of disclosure;

FIG. 3 is a vertical sectional view as taken generally along line 3—3 of FIG. 2;

FIG. 4 is a top plan view as seen generally from line 4—4 of FIG. 2, illustrating the modular concept of the motor and drive unit;

FIG. 5 is an enlarged detailed sectional view of a portion of FIG. 4, specifically pertaining to the brush-holding means and the spring for biasing the brush against the commutator contacts with the brush removed;

FIG. 6 is a side elevational view of the speed control mechanism incorporated in the subject invention, as seen generally from line 6—6 of FIG. 4;

FIGS. 7 and 8 are enlarged detailed sectional views as taken generally along lines 7—7 and 8—8, respectively, of FIG. 6; and FIG. 9 is a schematic illustration of the improved speed control circuit incorporated in the disclosed invention.

DETAILED DESCRIPTION OF THE INVENTION

In FIG. 1, the illustrated mixer 10 has an exterior case or housing 11 including a handle 12 with a speed control lever 13 thereon accessible by the user's thumb. The mixer 10 has a modular motor and drive unit 14 (see FIGS. 2 and 4) which rotatably supports a pair of parallel beaters 15 that depend downwardly from driven sockets 16 at the forward end of the case 11. The beaters 15 are rotated in opposite directions relative to one another with the beater vanes 15a overlapped but set in staggered relationship as is well known in the art. A beater ejector 17 accessible by the user's thumb is provided to axially disengage the beaters 15 for ejecting them from the receiving drive sockets 16 (see FIGS. 2 and 3 for example). The ejector 17 has side wings 17a (FIG. 2) that are guided by and slide between spaced case walls 17b (FIG. 2), a torsion spring 17c fitted in an opening in the ejector which biases the ejector 17 upwardly away from the beaters 15, and a horizontal case wall 17d which extends between the walls 17b and is abutted by wings 17a to limit the upward movement of the ejector 17. Spaced ejector arms 17e, which are aligned with upper ends 15b of the beaters 15, are engageable with said upper ends 15b to eject the beaters 15 from the sockets 16 upon downward depression of the ejector 17 in a manner well known in the art.

In the illustrated embodiment, the case or housing 11 is formed of two case or housing halves 11a and 11b having edges which meet along a peripheral parting line 19, the housing half edges being stepped to provide overlapped tongues 19a, as illustrated in FIG. 3. The parting line 19 extends around the entire periphery of the two casing halves 11a and 11b in a vertical plane except in the areas where intentional openings are to be provided. Thus, elongated opening 20a (FIG. 2) is provided for speed control lever 13, opening 20b is provided for the beater ejector 17, and opening 20c is provided for a power cord 21. The power cord 21 is mechanically keyed to the housing 11 by an enlarged, integrally molded strain and flex relief portion 21a which is trapped between internal walls 21b and 21c formed on housing half 11a.

The modular unit 14 includes a one-piece frame 22 (FIG. 4) on which four laterally disposed projections 23 are integrally formed at the four side corners of the frame 22. The modular motor unit 14 is adapted to fit within the casing halves 11a and 11b and to be confined thereby at four spaced locations, two on each casing half, defined by appropriate guiding ribs or wells 24 (see FIG. 3) which are adapted to receive the four projections 23 on the modular unit 14. Preferably, a resilient boot or cushion 25 is provided between each projection 23 and its associated well 24 whereby to isolate any vibration of the modular unit 14 from the case or housing 11.

Seven sets of cooperating posts 26a and wells 26b (FIG. 2) integrally formed respectively on the casing halves 11b and 11a are provided at spaced locations adjacent the parting line 19 to telescope together whereby to align the casing halves 11a and 11b in proper registry. In the preferred embodiment, adhesive between the cooperating posts 26a and wells 26b, and possibly also between the mating peripheral edges of the casing halves at certain locations along the parting line 19, serves to secure the casing halves 11a and 11b together as the finished housing 11. In addition, casing half 11a is provided with a pair of integral, axially bored, laterally disposed abutments 27a and casing half 11b has a pair of aligned, laterally projecting knurled metal pins 27b received therein and receivable, with a press-fit engagement, in said bored abutments 27a. The metal pins 27b serves as an initial alignment guide for the adhesive-coated posts 26a, provide a clamping function for casing halves 11a and 11b during the adhesive set-up time, and also provide an increase in the shear strength of the final assembly. In assembly, the modular motor unit 14, the ejector 17, and the cord 21 are positioned in place in casing half 11a and the other casing half 11b, with the posts 26a and peripheral edges coated with adhesive, is then fitted over these components and in aligned engagement with casing half 11a.

The modular motor unit frame 22 has parallel openings 28 (see FIG. 3) for rotatably receiving the beater sockets 16, previously mentioned, which sockets 16 at their upper ends have formed integrally thereon pinion gears 30. Further, the modular motor unit frame 22 has spaced side rails 32 (FIG. 4) which leave interior space 32a therebetween within which space the field coil 34 and armature 35 of the motor 14a are located. In this regard, the field coil 34 is preferably in the form of a U-shaped element 36 (schematically illustrated in FIG. 9) having an intermediate web section 36a interconnecting two side posts 36b. Opposing concave faces 36c are cut out from the posts 36b and cooperate in spaced relationship with exterior pole faces 35a (FIG. 9) of the armature 35; and the windings (to be discussed in detail hereinafter) of the field coil 34 are wound around the web section 36a.

The armature 35 is supported on a shaft 42 (FIG. 4) and spaced bearings 43 rotatably embrace the shaft at spaced locations and are held relative to the modular motor frame 22 in recesses formed between spaced walls 44 of the frame 22. In the illustrated preferred embodiment, C-shaped spring retainers 45 are positioned with their intermediate webs 45a overlying the bearings 43 and their end barbs 45c biased into and held within receiving openings 45b in the modular motor unit frame 22. Armature windings 46 are wound over an insulation sleeve 47 (FIG. 4) on the shaft 42 and between the pole faces or armature teeth 35a and are connected electrically to commutator contacts or bars 49 supported (FIG. 9) also on the shaft 42, the bars 49 being part of commutator means 48. The specific windings 46 of the armature 35 and their connection to the commutator bars 49 form no part of this invention and thus are only in part schematically illustrated in FIG. 9. The armature windings 46 and pole faces 35a thus are located inwardly adjacent and spaced from the concave field post faces 36c, while the shaft 42 accommodates rotation of the armature 35 relative to the field post faces 36c, as is known in the electric motor art.

A cooling fan 50 keyed to the rear end of the shaft 42 draws air through forward inlet casing openings 51a (FIGS. 1, 2 and 3), the speed control opening 20a, and any other opening in the case 11 for passage over and past the motor 14a and through air outlet openings 51b formed in the rear of the case 11. To provide rapid air flow axially of the motor 14a past the field coil 34 and over the armature 35, transverse ribs 51c (see FIG. 2) are formed on the casing halves 11a and 11b to be closely adjacent to but spaced from these components. The shaft 42 has a worm gear 52 (FIG. 4) formed on the forward end thereof which cooperates with the socket pinions 30 and thereby contra drives the sockets 16 and beaters 15 in opposite directions upon shaft rotation.

The commutator means 48 also includes a pair of commutator brushes 53 (FIGS. 4 and 9), guided by wall means 54 (FIG. 5) which are formed in the modular motor frame 22, which are biased toward the commutator bars 49. A separate torsion spring 55 is provided for biasing each commutator brush 53 against the commutator bars 49 with the springs 55 serving as electrical conductors. Each torsion spring 55 (FIG. 5) has opposed spaced legs 56 and 57 and an intermediate bend or loop section 58 interconnecting the legs 56 and 57. Each bend or loop section 58 fits over a post 59 formed on the modular motor frame 22 while each leg 56 has a downwardly bent end 56a which is trapped in a slot 60 formed on the side of the modular motor frame 22. The end 56a of one brush spring 55 is connected to one conductor 82 (FIG. 9) of the power cord 21 and the end 56a of the other brush spring 55 is connected to a sliding contact 76 (FIGS. 6 and 8) of a speed control to be described hereinafter. The other leg 57 of each spring 55 extends through an opening 54a (FIG. 5) in the side wall means 54 forming its associated commutator brush retaining guide and is disposed transversely to the linear movement of its associated brush 53 with its free end 57a formed to engage the rear end of said brush 55 (FIG. 4). The spring leg 57 thus serves to bias its commutator brush 53 toward the commutator bars 49. The opening 54a in the side guide wall means 54 terminates at 54b (FIG. 5) just short of the commutator bars 49 whereby to prevent the free end 57a of the spring leg 57 engaging the commutator bars 49 (as clearly illustrated in FIG. 5) even when the relatively soft material, generally a carbon compound, of the brush 53 has been expended. This is of significance since the spring 55 is of a harder and more durable resilient material, such as a copper alloy, so that contact of the spring 55 against the rotating commutator bars 49 would most likely eventually tear up the bars 49.

Of additional significance to this invention, the field coil 34 has a plurality of windings 64 (FIG. 9) around the web 36a of the field coil element 36, and in this regard a plastic insulating spool or bobbin 65 (FIG. 6) is slidably fitted over the web 36a of the U-shaped element 36 with the windings 64 being wound thereon in order to insulate the windings 64 electrically from the field coil element 36. Further, the field coil 34 is formed of many windings (schematically illustrated in FIG. 9 for example) and identified as windings 64a, 64b, 64c, 64d, 64y and 64z. The implication of the alphabet notation is not that there are a specific number of windings 64 corresponding to the number of letters in the alphabet but that there are a relatively large number, for example, twenty windings 64. Each winding 64 is formed of a plurality of separate turns 66 with the last turn 66z of each winding 66 being diverted away from the main field coil 34 to form a loop tap 68. The many illustrated loop taps 68a, 68b, 68c, 68y and 68z thus correspond to the end turns of the illustrated windings 64a, 64b, 64c, 64y and 64z.

The windings 64 and loop taps 68 themselves are formed from a continuous extent of wire symbolically illustrated in FIG. 9 and the wire is covered with an insulating coating 70 (See FIG. 8). Thus, the adjacent turns 66 of both the field coil windings 64 and the adjacent loop taps 68 are electrically insulated from one another. The loop taps 68 are progressively arranged or laid in adjacent side-by-side fashion over an elongated spindle or tab 71 formed integrally on the bobbin 65, as best illustrated in FIGS. 2, 6 and 8. This is symbolically illustrated in FIG. 9 even though the loop taps 68a, 68b, 68c, 68y and 68z are not shown in their closely adjacent side-by-side relationship.

An electrically conductive, resilient wiper or leaf 75 is mounted for movement relative to and across said loop taps 68 and has a generally truncated contact 76 that preferably is engageable with either a single loop tap 68 or bridges a minimum number of adjacent loop taps 68 in any one of its possible positions with the exception of its "off" position. The wiper 75 and the loop taps 68 define a effective but inexpensive speed control 73.

In a continually variable slide wiper speed control system, as is disclosed herein, the contact 76 of the wiper 75 must be engaged with at least on loop tap 68 at all times in order to maintain contact and a speed output. Thus, in sliding the wiper contact 76 from loop tap 68a to loop tap 68b, for instance, the wiper contact 76 will, at some point in time, have to bridge the two loop taps 68a and 68b whereby field coil winding 64b is effectively shorted out and develops a circulatory current which generates heat and reduces the efficiency of the motor 14a. Therefore, to minimize such power loss and heat problems, it is desirable to have a substantially large number of loop taps 68 with a relatively few turns in the field coil windings 64 defined therebetween and to have the bridging contact of the wiper contact 76 limited to a maximum of two adjacent loop taps 68. For practical considerations, the number of loop taps 68 in the preferred embodiment disclosed herein has been limited to twenty.

The wiper 75 is riveted to the lower end of an angled lever 77 which is pivotably mounted on a post 78 provided on the frame 22 with the upper end of the lever 77 forming the speed control lever 13 previously mentioned. The resilient wiper 75, which is biased transversely of its movement to retain the contact 76 in engagement with the loop taps 68, is designed to provide a specific quantity of force or pressure by the contact 76 against the loop taps 68 whereby to provide smooth operation and suitable longevity of the speed control 73. It has been found that engagement of the contact 76 with a minimum of two adjacent loop taps 68 is preferred and, it is noted, that the contact 76 may be slightly skewed relative to its arc of travel whereby to ensure that the contact 76 bridges a minimum of two loop taps 68 at all times except in its "off" position. The "off" position is defined by an end portion 71a of the spindle 71 about which no loop taps 68 are wound. As best shown in FIGS. 6 and 8, the insulation coating 70 on the loop taps 68 is shaved off locally along the path 81 of movement of the contact 76 whereby the wiper contact 76 can establish electrical continuity with the loop taps 68. Rotation of the lever 77 adjustably positions the wiper contact 76 relative to certain specific adjacent loop taps 68 corresponding to specific windings 64 of the field coil 34, thereby providing a substantial number of possible motor speeds.

The specific electrical power circuit for the motor 14a is illustrated in FIG. 9, where an a.c. power source is provided across leads 82 and 83. Lead 82 is connected in series, through the brushes 53, the commutator contacts 49 of the commutator means 48, and the armature windings 46, with the wiper contact 76 through a lead 84 and the wiper 75. With the contact 76 in engagement with a minimum of two loop taps 68, the circuit is completed through the path of least resistance, for instance, as illustrated in FIG. 9, through loop tap 68b, field winding 64b, loop tap 68a and field winding 64a to lead 83, whereby the motor 14a operates at a specific speed. In this position of the wiper 75, the field windings 64c, 64d, 64y and 64z, toward the unconnected end of the field coil at tap 68z are bypassed. The motor speed is varied by slidably moving the wiper 75 along the designated path 81 with different loop taps 68 being engaged by the wiper contact 76, the fewer field windings 64 in the power circuit, the faster the motor speed. Thus with the wiper contact 76 in engagement with loop taps 68a and 68b, only field winding 64a would be in the power circuit and the motor 14a would operate at maximum speed. Conversely, with the wiper contact 76 in engagement with loop taps 68y and 68z, all of the field windings 64a through 64y would be in the power circuit and the motor 14a would operate at its slowest speed.

With the speed control 73 described herein, a large number of separate field coil windings 64 with an associated loop tap 68 may be provided very economically. This low cost tapped field motor 14a differs from most known tapped field coil motors wherein lead wires are connected between various loops of a field coil and a multi-contact switch with the cost saving resulting from elimination of the usual steps of stripping insulation from both ends of the lead wires, electrically connecting the lead wires both to various loops of a field coil and to the switch contacts, and insulating such connections, as well as elimination of the cost of the switch, the lead wires and the insulation. Because of the large number of loop taps 68 possible, a large number of incremental motor speeds are available whereby an almost continuous or nondiscrete form of speed control is provided. As no multi-contact switch is used in the speed control 73, the number of speed taps is not limited to the number of contacts on a particular switch.

In the schematic illustration of FIG. 9, the field coil windings 64 are shown serially connected with the loop taps 68 and with each other, and continually progress across the length of the field coil web 36a. However, in actual practice, it is probable that each field coil winding 64 would be layered back and forth as the wire is wound around the bobbin 65 by automatic winding equipment. Thus, the loop taps 68 taken from the various field coil windings 64 would thereby be from progressively larger radii or layers on the bobbin 65, as is somewhat illustrated in FIG. 6. The loop taps 68 are looped progressively over the spindle 71 formed on the bobbin 65 in side-by-side relationship and redirected back to the bobbin 65 for the next winding 64.

Lending further to the economy of construction and ease of assembly, note that the post 78, about which the speed control shift lever 13 is adapted to pivot, has laterally extended ears 87 (FIG. 7) which fit through a cooperative ear-shaped opening 88 formed in the lever 77 upon which the shift control 13 is formed, when the lever 77 is rotated to the position indicated in phantom in FIG. 6, whereby to facilitate assembly and disassembly of the lever 77 on the post 78. The ears 87 on the post 78 otherwise overlie a recessed body portion 88a (FIG. 7) of the lever 77 adjacent the opening 88 when the lever 77 is rotated through its operative positions (FIG. 6) with the wiper contact 76 in engagement with the loop taps 68, whereby to retain the lever 77 on the post 78. The lever 77 thus can be quite easily assembled onto the modular unit 14 with no specific connector and with little actual connecting effort. The lead 84 is electrically connected to the rivet securing the leaf 75 to the lever 77, as at 84a (FIGS. 2 and 6).

A detent arrangement 90 (best illustrated in FIGS. 2 and 3) is provided to retain the lever 77 in any series of positions of the wiper contact 76 against the loop taps 68 (FIGS. 2, 6 and 8). This detent arrangement 90 is characterized by a leaf spring 91 (FIGS. 3 and 6) which is secured at one end by a rivet 91a (FIGS. 2, 3 and 6) to one side 77a of the lever 77 and has a vertically disposed raised rib 91b (FIGS. 3 and 6) which is biased against an edge 92a (FIG. 2) of a detent element 92 which is removably retained in a slightly bowed condition between three sets of slotted ribs 93 (FIG. 2) integrally formed on casing half 11a (FIG. 2). The other side 77b (FIG. 3) of lever 77 slidably engages an end surface 94 of a horizontally disposed transversely extending wall 94a integrally formed on casing half 11b (FIG. 3). The edge 92a (FIG. 2) of detent element 92 is provided with any desired pattern of detents 92b whereby to provide a desired number of different speeds of the motor 14a upon forward movement of the control lever 13 from its rearwardmost "off" position. An upper angularly bent end 91c (FIG. 3) of the leaf spring 91 extends freely through an opening 77c provided in the lever 77 whereby to facilitate flexing movement of the leaf spring 91 in and out of the detents 92b (FIG. 2) during movement of the control lever 13 relative to the detent element 92.

The modulator motor and drive unit concept disclosed herein in combination with the low cost speed control disclosed herein facilitates the production of a large number of different product models, of hand mixers for example, having different numbers of beater speeds (5 speeds, 7 speeds, 10 speeds, 12 speeds, etc.) using the identical motor and drive module and even different design housings as long as the interior module-mounting configuration is the same by merely inserting different detent elements 92 having differing speed patterns thereon together with suitable speed designating graphics adjacent the path of movement of the speed control lever 13. Thus, the motor and drive unit modules 14 may be mass-produced at a substantial cost saving.

In summary, the disclosed appliance 10 is easy and economical to fabricate with the modular motor and drive unit 14 being supported and permanently encased between the mating housing halves 11a and 11b primarily by adhesive means and without the use of mechanical fasteners. Further, the speed control 73, although it is an infinite or continuously variable speed type, is economical to produce since it requires no separate mechanical switch components, relying, instead, on a sliding wiper 75 that selectively contact any one of a plurality of loop taps 68. Still further, the commutator brush biasing spring 55 is positively restrained by shoulder 54b from possibly contacting the rotating commutator contacts 49, thereby preventing damage to or dangerous malfunctioning of the modular unit.

While only a single embodiment of the present invention has been shown, it will be understood that various changes and modifications will occur to those skilled in the art and it is contemplated in the appended claims to cover all such changes and modifications as fall within the true spirit and scope of the present invention.

What is claimed as new and desired to be secured by Letters Patent of the United States is:

1. In combination, a modular universal motor and drive unit comprising a one-piece frame having spaced rails defining a space therebetween, a shaft having a motor armature and commutator means provided thereon, bearing means on said frame supporting the shaft at spaced locations longitudinally of said frame with said armature and said commutator means disposed in said space, a field coil wound on a bobbin mounted on said frame and having a speed control associated therewith including an upwardly projecting control lever pivotally mounted on said frame, output drive means suppported by said frame, means operably connecting the shaft to power said output drive means, commutator brushes of depletable material movably supported in guide means defined by the frame to cooperate with said commutator means, and four laterally disposed modular-unit support means provided on said frame at four spaced corners thereof; and a housing enclosing and supporting said modular unit with said output drive means exposed and said control lever projecting therefrom, said housing being formed by two vertically disposed housing halves having peripheral edges that abut along a parting line, four complementary support means formed on said housing halves, two on each housing half and cooperating with said four modular-unit support means to provide sole support of said modular unit therewithin, and means holding said housing halves together with said peripheral edges abutted.

2. A combination according to claim 1, wherein said speed control is defined by a plurality of loop taps from said field coil wound on a spindle integrally formed on said bobbin in side-by-side relationship thereon and by a wiper contact movable by said control lever along a path defined by the removal of insulation from said side-by-side loop taps whereby to vary the number of effective field coil windings and thus the speed of said output drive means, and wherein a detent element having a detent pattern for a desired number and selection of motor speeds is replaceably mounted on one of said housing halves for cooperative engagement by said control lever.

3. A combination according to claim 1, wherein said modular-unit field coil is formed of many separate windings serially connected together from one end of said field coil to the other end, each winding consisting of several separate turns and a loop tap taken off of the end turn of each winding, the loop taps of said separate windings being electrically insulated from one another and being arranged in side-by-side relationship on a spindle projecting from said bobbin, a wiper contact slidably movable across side-by-side loop taps along a path defined by the removal of insulation therefrom and adapted to establish contact with one or an adjacent pair of said loop taps, means for slidably moving said wiper contact along said path so as to contact said loop taps selectively, and means connecting said one end of said field coil and said wiper contact in a power circuit with said armature commutator means, whereby the selected position of said wiper contact relative to said loop taps bypasses none or some of said windings of said field coil between said wiper contact and the other end of said field coil to vary the effective motor speed.

4. A combination according to claim 1, wherein said means for holding said housing valves together comprises a plurality of spaced cooperating pairs of post and well means formed respectively one each on each housing half and adapted to telescope together when the peripheral edges of the housing halves are abutted, and wherein adhesive is disposed between said cooperating pairs of post and well means to bond said housing halves together.

5. A speed control for an electric-motor operated device comprising an armature having a commutator connected in series between one side of an a.c. power supply and a movable wiper contact, a field coil wound around a bobbin and connected to the other side of said a.c. power supply and characterized by a plurality of separate, serially connected windings each of which has a loop tap wound around a spindle projecting from said bobbin with said loop taps being disposed on said spindle in side-by-side relationship with a wire coating thereof insulating each loop tap from the loop taps disposed on either side thereof, said wiper contact being movable across said loop taps along a path defined by the removal of the insulating coating from the outer surfaces of said loop taps, movement of said wiper contact along said path serving to establish electrical contact of same with one or an adjacent pair of said loop taps whereby to control the speed of said motor by varying the number of said field coil windings in the power circuit, and means cooperatively engageable with a detent element having a desired detent pattern formed thereon for moving said wiper contact between selected positions along said path to provide a specific number and selection of motor speeds for said electric-motor operated device.

6. A modular electric-motor-driven device having a desired selection of motor speeds comprising, a motor and drive unit module characterized by a frame member having a motor mounted thereon, housing means for said module, interengageable means on said module frame and said housing means for supporting said module within said housing means, and a speed control for said motor characterized by a field coil wound on a bobbin and having a substantial number of loop taps looped over a spindle projecting from said bobbin in side-by-side relationship thereon, said field coil and loop taps being formed from a continuous extent of insulated wire, by a movable wiper contact mounted on one end of a control lever pivotally mounted on said module frame with its opposite manually engageable end extending through a slot provided in said housing means, said wiper contact being movable across said side-by-side loop taps along a path defined by the partial removal of insulation from said loop taps whereby to establish electrical contact with various ones of said loop taps to vary the speed of said motor, and by a detent element mounted on said housing means for cooperative engagement by said control lever and having a detent pattern formed thereon to provide any desired selection of motor speeds.

7. A modular device according to claim 6, wherein said motor is further characterized by a commutator and by a pair of brushes biased into contact with said commutator and formed of depletable material, wherein guide wall means are formed in said module frame for each brush, wherein a torsion spring biases each brush toward said commutator with each of said springs having opposite end legs and an intermediate bend interconnecting said legs, wherein each spring is mounted with one end leg extending through an opening provided in said wall means and biased against a rear end of said brush, and wherein said wall means defining said opening is adapted to support said one spring leg and preclude the same from contacting said commutator upon depletion of said brush material.

8. A modular hand mixer having any desired selection of motor speeds comprising, a motor and drive unit module characterized by a frame member having a motor, beater drive spindles, and drive means from said motor to said spindles supported thereon, housing means for said module, interengageable means on said module frame and said housing means for supporting said module within said housing means, and a speed control for said motor characterized by a field coil wound on bobbin and having a substantial number of loop taps looped over a spindle projecting from said bobbin in side-by-side relationship thereon, said field coil and loop taps being formed from a continuous extent of insulated wire, by a movable wiper contact mounted on one end of a mixer-speed control lever pivotally mounted on said module frame with its opposite manually engageable end extending through a slot provided in said housing means, said wiper contact being movable across and biased against said side-by-side loop taps along a path defined by the partial removal of insulation from said loop taps whereby to establish electrical contact with various ones of said loop taps and provide different motor speeds, and by a detent element mounted on said housing means for cooperative engagement by said control lever and having a detent pattern formed thereon to provide any desired selection of mixer speeds.

9. The modular hand mixer according to claim 8 wherein said housing means is characterized by vertically split housing halves having telescopically interfitting well and port means formed on the inner surfaces thereof for alignment and connection purposes, and wherein said housing halves are secured together by adhesive applied both to said well and port means and to abutting peripheral edges of said housing halves.

* * * * *